UNITED STATES PATENT OFFICE.

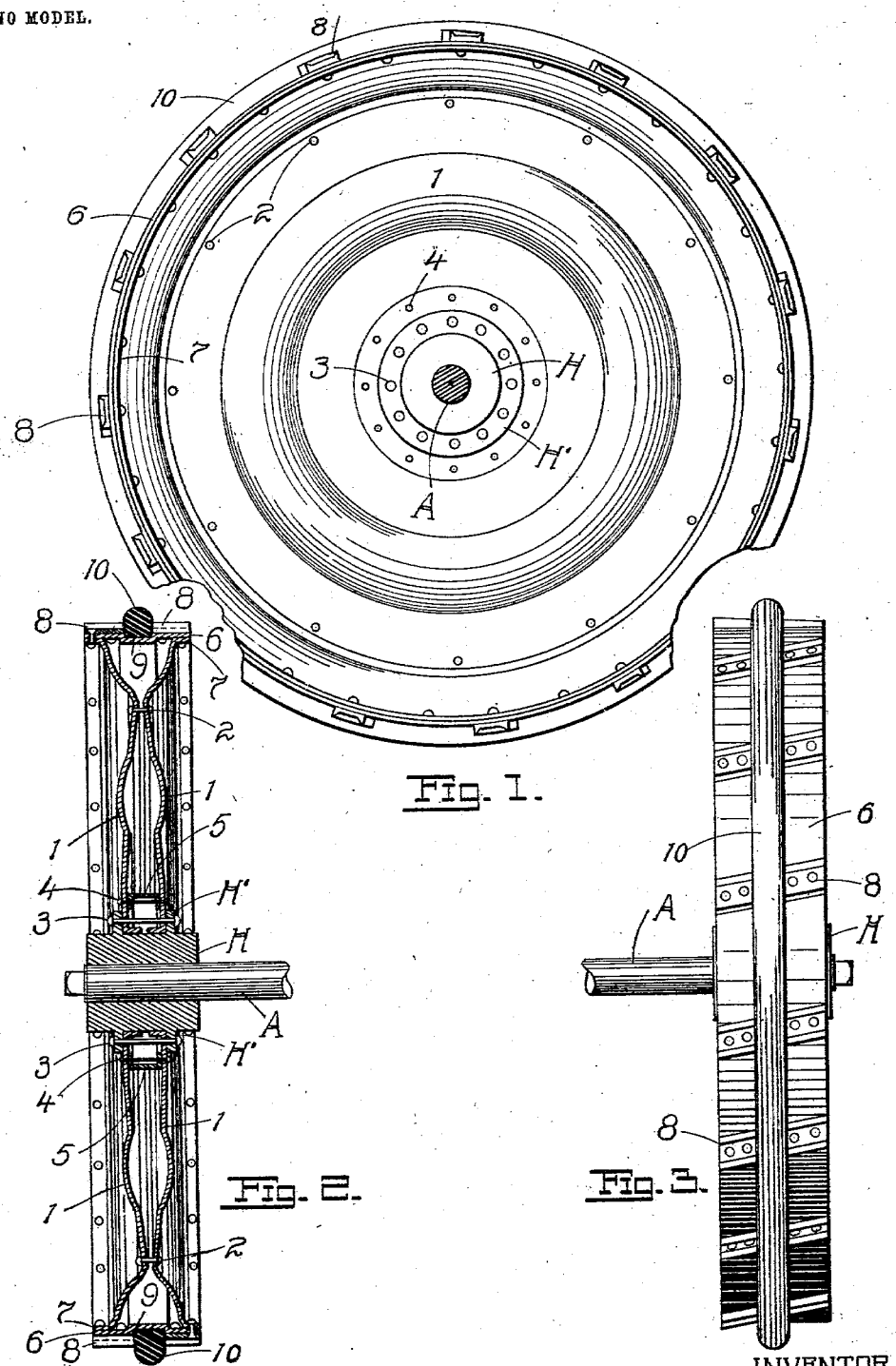

JEAN BAPTISTE BOULICAULT, OF ST. LOUIS, MISSOURI, ASSIGNOR OF ONE-HALF TO E. B. CAMPBELL, OF ST. LOUIS, MISSOURI.

VEHICLE-WHEEL.

SPECIFICATION forming part of Letters Patent No. 721,002, dated February 17, 1903.

Application filed August 15, 1902. Serial No. 119,723. (No model.)

*To all whom it may concern:*

Be it known that I, JEAN BAPTISTE BOULICAULT, a citizen of the United States, residing at St. Louis, State of Missouri, have invented certain new and useful Improvements in Vehicle-Wheels, of which the following is a full, clear, and exact description, reference being had to the accompanying drawings, forming a part hereof.

My invention has relation to improvements in vehicle-wheels; and it consists in the novel construction of wheel more fully set forth in the specification and pointed out in the claim.

In the drawings, Figure 1 is an elevation of the wheel. Fig. 2 is a middle vertical section of the wheel, and Fig. 3 is an edge view of the wheel.

The object of my invention is to construct a wheel for vehicles generally which will insure easy travel over roads of any description, be the same smooth or rough, hard or soft.

It consists in details which may be described as follows:

Referring to the drawings, A represents the axle of the vehicle, be the same an ordinary wagon, carriage, or automobile, the invention not being restricted to any particular class of conveyances. The wheel is composed of two disks 1 1, pressed or formed so as to possess a maximum degree of stiffness and at the same time present a neat appearance, said disks being united at convenient points by rivets 2 and connected to the hub H by pins 3 passed through the flanges H' of the hub, the disks being further reinforced around the hub by an annular channel-bar 5, through the sides of which are passed the rivets 4, coupling the same to the disks. The outer or peripheral edges of the disks are spanned by the rim 6, riveted to the respective disks, the rivets being passed through the marginal flanges 7 of the disks and through the bases of the diagonally-disposed channel plates or shoes 8. The latter are disposed peripherally about the central groove or depression 9 of the rim 6, the axes of the shoes being inclined to the plane of rotation of the wheel and their purpose being to plow or cut their way through soft soil should the weight of the vehicle cause the tire 10 to become embedded in such soft earth or soil.

The tire is preferably made of rubber and is secured within the groove 9 in any mechanical manner known in the art.

It is apparent, of course, that this form of wheel need not be limited in its application to ordinary roads, for the principle of the shoes 8 can be made available for ice roads, snow, and the like.

Having described my invention, what I claim is—

A vehicle-wheel composed of a pair of disks rotatable about an axle, and united at convenient points by rivets, an annular stiffening channel-bar surrounding the hub and secured to the disks, a peripheral rim having a central depression, secured to the outer edges of the disks, a tire located within said depression and extending a suitable distance beyond the peripheries of the disks, and a series of channel plates or shoes disposed on the rim on each side of the tire, and inclined to the plane of rotation of the wheel, substantially as set forth.

In testimony whereof I affix my signature in presence of two witnesses.

JEAN BAPTISTE BOULICAULT.

Witnesses:
EMIL STAREK,
WILL C. KELLEEN.